United States Patent [19]

Cress

[11] Patent Number: 5,092,666
[45] Date of Patent: Mar. 3, 1992

[54] METHOD AND SYSTEM FOR CONFORMABLY FITTING EYEGLASS FRAMES

[76] Inventor: Jonathan Cress, 145 Bayona Dr., Santa Cruz, Calif. 95060

[21] Appl. No.: 439,960

[22] Filed: Nov. 20, 1989

[51] Int. Cl.⁵ .................................................. G02C 5/12
[52] U.S. Cl. ............................... 351/136; 156/272.2; 156/275.5; 351/139; 428/40
[58] Field of Search .................... 156/272.2, 275.5; 351/132, 136, 139; 428/40, 79

[56] References Cited

U.S. PATENT DOCUMENTS

| | | | |
|---|---|---|---|
| 2,774,279 | 12/1956 | Olson et al. | 351/132 X |
| 2,835,063 | 5/1958 | Worthington | 428/28 X |
| 3,582,193 | 6/1971 | Bogyos | 351/132 X |
| 3,584,939 | 6/1971 | Olson et al. | 351/132 |
| 4,070,104 | 1/1978 | Rice | 351/132 X |
| 4,131,341 | 12/1978 | Bradley, Jr. | 351/132 |
| 4,293,201 | 10/1981 | Fukuda et al. | 351/139 X |
| 4,302,080 | 11/1981 | Bononi | 351/132 X |
| 4,370,358 | 1/1983 | Hayes et al. | 428/355 X |
| 4,405,214 | 9/1983 | Bolle | 351/132 X |
| 4,923,754 | 5/1990 | Lee et al. | 428/450 X |

FOREIGN PATENT DOCUMENTS

| | | | |
|---|---|---|---|
| 2938241 | 4/1981 | Fed. Rep. of Germany | 351/132 |
| 2117919A | 10/1983 | United Kingdom | 351/132 |
| 2132379 | 7/1984 | United Kingdom | 351/136 |

*Primary Examiner*—Henry F. Epstein
*Attorney, Agent, or Firm*—Townsend and Townsend

[57] ABSTRACT

Eyeglass frames are fitted to an individual's face by placing individual moldable pads at the region of contact between the eyeglass frame and the face. The moldable contact pads include a moldable layer which is formed from a material which is initially in a malleable state and which may be subsequently cured to a non-malleable but resilient state. The contact pads are first conformed to the individual wearer's features by gently pressing the eyeglass frame against the wearer's face. The pads are then cured to retain the imparted shape by exposure to radiation which cures the malleable material initially present in the contact pads.

23 Claims, 2 Drawing Sheets

METHOD AND SYSTEM FOR CONFORMABLY FITTING EYEGLASS FRAMES

BACKGROUND OF THE INVENTION

1. Field of the Invention

The present invention relates generally to the fitting of eyewear frames, and more particularly to the use of moldable pads for conforming the inner surfaces of an eyeglass frame to a wearer's facial features.

When a listing of life's minor annoyances is someday compiled, the tendency of eyeglasses and other eyewear frames to slip from their proper position on a wearer's face will be prominently mentioned. The fact that eyeglasses are manufactured in standard designs and sizes, while human physiognomy is not, assures that in most cases eyeglass frames will not fit as well as would be desired. In addition to slippage (which is exacerbated by sweat, oil, and cosmetics which lubricate the interface between the eyeglass frame and the face), ill-fitting eyeglasses can cause substantial discomfort as well as a reduction in optimal visual acuity.

In order to improve the fit of off-the-shelf eyeglass frames, the use of resilient nose bridge pads has been proposed. For example, thin silicone rubber pads are available having an adhesive surface which may be applied to the inner surface of the nose bridge of an eyeglass frame. The pads can temporarily and partially conform to the wearer's nose and a significant improvement in fit can be achieved. Such pads, however, do not retain the contour of the wearer's face and are thus not individually matched to the wearer's frames or facial features. Thus, in many cases, the pads fail to conform to the nose as closely as would be desired and still leave room for improvement.

For these reasons, it would be desirable to provide eyeglass pads which are substantially permanently conformable to an individual wearer's facial features. The pads should be inexpensive, easy to manufacture, easy to use, and be physiologically compatible. It would further be desirable to provide methods for applying such pads to an eyeglass frame and for subsequently conforming the shape of the pad to a wearer's facial features in an optician's office with minimum equipment.

2. Description of the Background Art

Pre-formed silicone rubber pads which may be adhesively attached to the inner surface of the nose bridge of an eyeglass frame are described in U.S. Pat. No. 4,302,080; U.K. Patent Application 2 117 919A; and German Patent Application 29 38 241. Such a silicone rubber pad is commercially available from Hilco Eyecessories, Plainville, MA. Soft nose bridges for eyeglass frames are described in U.S. Pat. Nos. 3,584,939 and 2,774,279. See also U.S. Pat. Nos. 4,405,214; 4,131,341; and 3,582,193.

SUMMARY OF THE INVENTION

According to the present invention, articles and methods are provided for individually fitting standard manufactured eyewear frames to a wearer's facial and cranial features. The articles are moldable pads, particularly nose pads, that may be secured to the eyewear frame and conformed to said facial and cranial features. The pads typically comprise a moldable layer capable of being conformed to the features and thereafter cured to substantially retain the imparted contours, a backing layer, and an adhesive layer. Usually, the pads will further comprise a peelable layer placed over the adhesive layer to facilitate manipulation of the pads. The pads may be pre-cut in a variety of geometries to conform to standard eyeglass frames, or may be cut from a larger sheet of material to fit virtually any shape of eyewear frame.

The pads are applied to the eyewear frame by contacting the adhesive surface on the conformable pad to the inner surface of the frame, including the nose bridge and optionally the bow portion of the temple pieces. After mounting on the eyewear frame, the pads are then conformed to the wearer's facial features, typically by placing the glasses on the wearer's face and then pressing the pads into the portions of the face and head which are contacted. The eyewear frame is then removed from the face and the pads are cured to substantially fix the contour just obtained, typically by radiation-induced cross-linking of a polymeric material which forms at least part of the moldable pad.

DESCRIPTION OF THE SPECIFIC EMBODIMENTS

Figure 1:
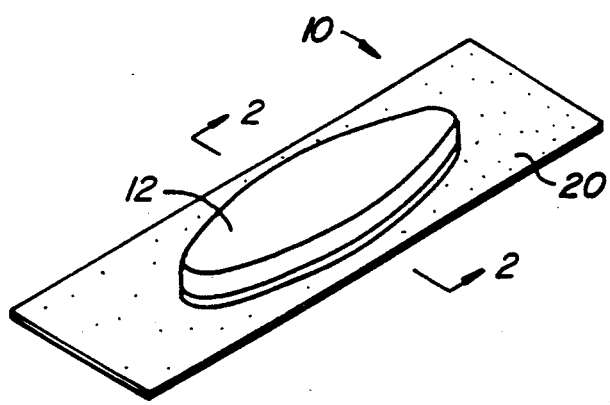
FIG. 1 illustrates a nose pad according to the present invention prior to mounting on an eyeglass frame.

The present invention comprises conformable pads and methods for using such pads for individually fitting eyewear frames to a wearer's face. The conformable pads are multi-layer structures including at least a moldable layer and an adhesive layer for attaching the moldable layer to the eyewear frames. Usually, a backing or support layer will be included to provide mechanical support or rigidity to the structure, and other layers, including adhesive, binding, and protective layers which may be included as necessary to complete the structure and facilitate handling. The pads may be secured to various locations on the eyewear frame, including the nose bridge area, brow area, and bow regions which are located behind the wearer's ears. The pads are then conformed to the individual wearer's facial and cranial features by placing the eyewear frames on the individual, pressing the moldable pads in place so that they are shaped to conform to the individual's physiognomy, and thereafter curing the pads so that such shape is substantially permanently imparted to the pads.

The present invention is suitable for a wide variety of eyewear, most notably including eyeglasses. Other types of eyewear that may be modified according to the present invention include goggles, ski masks, underwater masks, and the like. For convenience, the remainder of this description will refer to eyeglasses, but it will be appreciated that the invention is not so limited.

The moldable layers are intended to conform to the wearer's physiognomy, specifically by filling the interstitial space between the contact area on the eyeglass frame and the corresponding region on the wearer's skin. The moldable layer may be composed of a wide variety of materials which are initially malleable but capable of being cured so that they can retain the shape imparted during the fitting process. The uncured material will be relatively soft, usually a solid in the sense that it will not flow or lose its shape without the application of external pressure. Alternatively, the moldable layer may be a viscous liquid so long as means are provided to maintain its shape prior to curing. After curing, the moldable material should remain resilient but will be no longer malleable to the extent that even external pressure will not cause a permanent change in shape. The cured material should further possess a slight tackiness or stickiness so that the moldable pads will be able to provide some degree of surface adhesion when placed against the wearer's skin. The materials, of course, should be physiologically compatible, and in particular be both non-toxic and non-allergenic. In general, the material should be suitable for prolonged contact with the wearer's skin without causing discomfort or irritation to any substantial degree. The material may be colored or transparent, depending largely on aesthetic compatibility with the particular eyeglass frame being fitted. Finally, it is desirable that the moldable material be both washable and non-degradable in various solvents, particularly in cleaning solvents which are commonly used for cleaning eyeglass lenses and frames.

The material of the moldable layer will usually be an inorganic or organic polymer which is initially free from cross-linking or only partially cross-linked, and which may be cured by radiation-induced cross-linking to provide the final desired pad material. Suitable polymers and copolymers include polyethylenes, polyethylene-ethylene glycol diacrylates, polyethylene-allyl methacrylates, polypropylenes, polypropylene-allyl acrylates, polyvinylchlorides, polyesters, polyethylenes, neoprenes, and silicone elastomers. Particularly preferred for use in the present invention are silicone elastomers which may be cured by exposure to ultraviolet radiation. The desired physical properties of suitable silicone elastomers are set forth in Table 1 hereinbelow.

TABLE 1

Physical Properties of Suitable Silicone Elastomers

| Property | Before Curing | | After Curing | |
|---|---|---|---|---|
| | Broad | Preferred | Broad | Preferred |
| Hardness[1] | <5 | 0.1–5 | >5 | 20–50 |
| Tensile Strength[2] | <1 | 0.0001–1.0 | >50 | 100–750 |
| Tensile Shear Strength[2] | <1 | 0.0001–1.0 | >10 | 50–1000 |
| Needle[3] Penetration | >5 | 10–80 | 0[4] | 0 |

[1]Durometer hardness on shore A scale measured by procedure described in ASTM D 2240.
[2]lbs./in.[2], measured by procedure described in ASTM D 412.
[3]mm/100 gm measured at 25° C. over 5 seconds according to ASTM D 5.
[4]Substantially no penetration after curing.

A specific silicone elastomer which has been found suitable for use in the present invention is a mixture of two commercially-available silicone elastomeric materials including RTV 108 available from General Electric Company and Nuva-SIL 76 available from the Loctite Corporation. These silicone elastomeric components may be mixed in their uncured state, typically being present in a ratio from about 1:10 to 10:1 by weight, usually from about 1:5 to 5:1 by weight, preferably being present at the weight ratio of 1:4.

The moldable layer will usually be laminated to a support layer which provides mechanical support for the soft, uncured material. In some cases, the moldable layer will be applied directly to the eyeglass frame, e.g., within a cavity formed in the eyeglass frame, and will not require additional support prior to curing.

In either case, the moldable layer will be adhered to a desired location on the eyeglass frame by an adhesive which is applied to at least a portion of the interface between the moldable layer (and any support layers if present) and the corresponding region on the eyeglass frame. Additional adhesive layers may be provided for securing the support layer to the moldable layer, and a further protective layer may be provided over the exposed adhesive layer when the moldable pads are intended to be applied by an optician who is fitting the eyeglasses.

Figure 2:
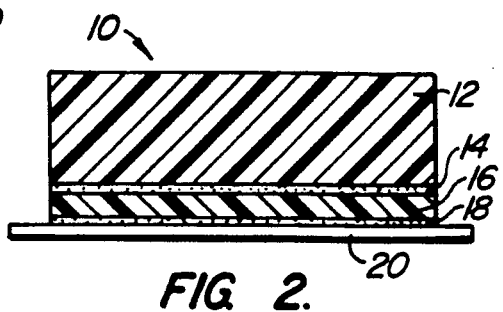
FIG. 2 is a cross-sectional view taken along line 2—2 of FIG. 1.

Referring now to FIGS. 1 and 2, a precut moldable pad 10 prepared in accordance with the principles of the present invention includes a moldable layer 12, and adhesive layer 14, a backing layer 16, a second adhesive layer 18, and a protective layer 20. The moldable layer 12 is formed from an uncured moldable material, as described above, and will have a thickness sufficient to allow for molding or conforming of the layer to the facial and cranial features of the wearer, typically being in the range from about 0.5 to 4 mm, more typically being in the range from about 0.75 to 1.5 mm. The peripheral geometry of the moldable layer 12 will correspond to the surface on the eyeglass frame to which it is to be adhered. A wide variety of geometries are possible, depending on the particular design of the eyeglass frame.

The backing layer 16 will generally be flexible as it will be applied directly to the eyeglass frame and must therefore be capable of conforming to the surface of the frame at the point of contact. Conveniently, backing layer 16 may be formed from a tape material which also includes the adhesive layer 14. A particular polyester tape having an adhesive suitable for the silicone elastomer of layer 12 is manufactured by the 3M Company and identified as No. 8401A polyester silicone adhesive tape.

The second adhesive layer 18 is intended to secure the backing layer 16 directly to the eyeglass frame, as will be described in more detail hereinafter. Thus, the adhesive must be suitable for binding both the material of backing layer 16 and the material of the eyeglass frame. Suitable acrylic adhesive formed on a transfer tape are commercially available from the 3M Company, designated as Y9482 PC and Y9485 PC adhesive transfer tape. Conveniently, the transfer tape further provides a protective layer 20 which may be removed immediately prior to use in order to expose adhesive layer 18. Alternatively, the protective layer 20 can be a variety of peelable materials which will protect the adhesive layer 18 prior to use. Particularly suitable are coated papers, such as siliconized papers, having surfaces which may contact the adhesive layer 18 and which may be cleanly pulled away from the adhesive layer without damaging the adhesive layer or tearing to leave parts of the backing layer on the adhesive layer.

Figure 3:
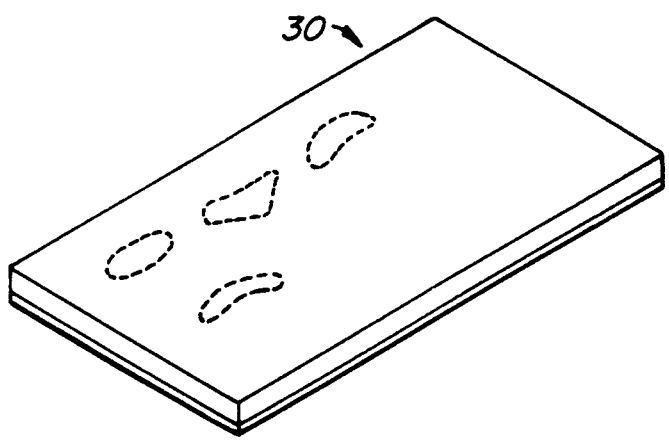
FIG. 3 illustrates a sheet of material suitable for cutting into individual nose pads, brow pads, or bow pads according to the present invention.

As an alternative to precut moldable pads of the type illustrated in FIGS. 1 and 2, a relatively large sheet 30 of the pad material (FIG. 3) may be provided. The sheet 30 will generally have the same layered structure as that illustrated in FIG. 2, but will be sufficiently large to allow for a number of individual pads to be cut therefrom. For example, cutting dies (not illustrated) may be provided so that a variety of particular pad shapes may be cut from the sheet 30. Several exemplary geometries are illustrated in broken line on the surface of the sheet 30.

Figure 4:
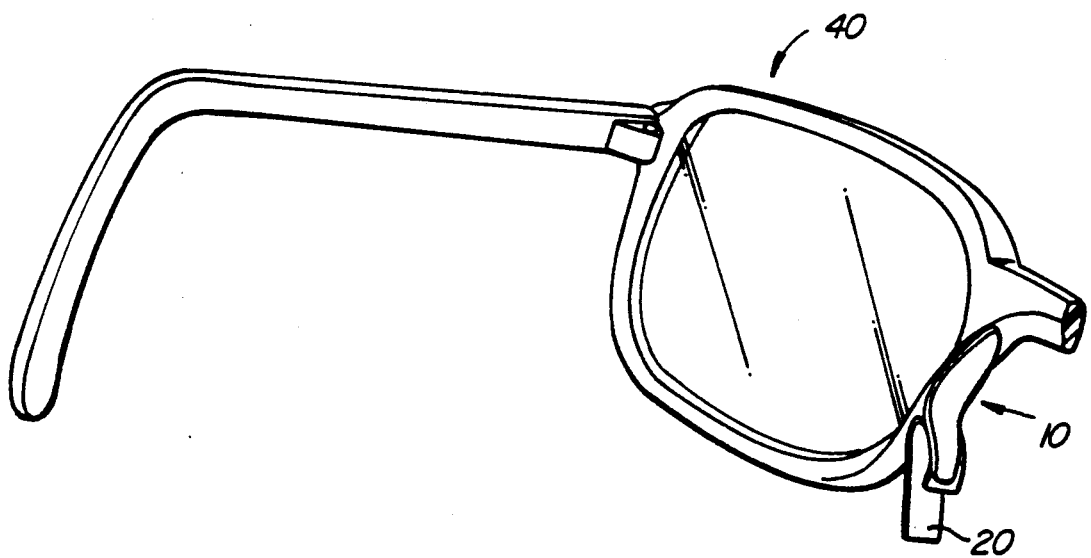
FIG. 4 illustrates a method for applying the nose pad of FIG. 1 onto the inner surface of the nose bridge of an eyeglass frame.
Figure 5:
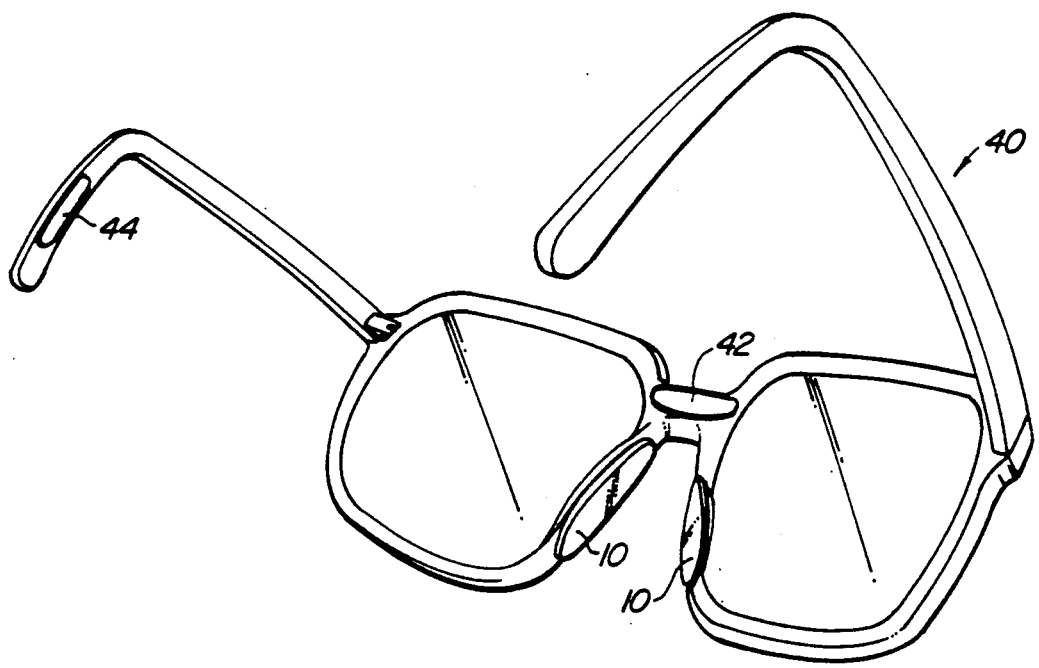
FIG. 5 illustrates an eyeglass frame having nose pads, a brow pad, and bow pads secured thereto in accordance with the principles of the present invention.

Referring now to FIGS. 4 and 5, a method for applying precut moldable pads 10 to an eyeglass frame 40 is illustrated. First, a precut moldable pad 10 is selected having a suitable geometry for both the type of eyeglass frame and the particular area on the eyeglass frame to which it is going to be applied. For example, a tear drop-shaped pad 10 may be applied to the inner surface of the nose bridge of eyeglass frame 40 by first partially peeling back the protective layer 20 to expose the second adhesive layer 18. The exposed portion of adhesive layer 18 is then contacted to the inner surface of the nose bridge of the eyeglass frame 40. Depending on the strength and curing characteristics of the adhesive in layer 18, the pad 10 may be removed and reattached until the desired mounting location is found. Preferably, the adhesive will cure over time, forming a very strong bond after several hours or less. When using adhesives which cure very rapidly, it may not be possible to move the pads after initial attachment. After initial attachment, the remainder of the protective layer 20 may be peeled from the rear of the pad 10 to expose the adhesive layer 18 and allow final attachment of the pad, as illustrated in FIG. 5. Generally, a second pad will be mounted on the opposite surface of the nose bridge, while a pad 42 may be located on the portion of the eyeglass frame which will contact the wearer's brow. Finally, contact pads 44 may be mounted on the two bow regions of the temple pieces of the eyeglass frame 40.

As illustrated in FIG. 5, the contact pads 10, 42, and 44 are simply secured to the exposed surface of a conventional manufactured eyeglass frame. In some cases, however, it will be desirable to provide cavities on the inner surface of the eyeglass frame in order to receive the moldable pads therein. Such cavities (not illustrated) may be provided during the manufacturing process of the eyeglass frame or may be formed by the fitting optician using an auger or other cutting instrument. When the cavities are formed during the manufacturing process of the eyeglass frame, it will also be possible to factory mount moldable pads within the cavities. In such a case, it will frequently be unnecessary to provide a backing layer 16 in order to support the moldable layer 12. The eyeglass frame itself will provide the necessary mechanical support for the moldable layer 12 prior to curing.

Figure 6:
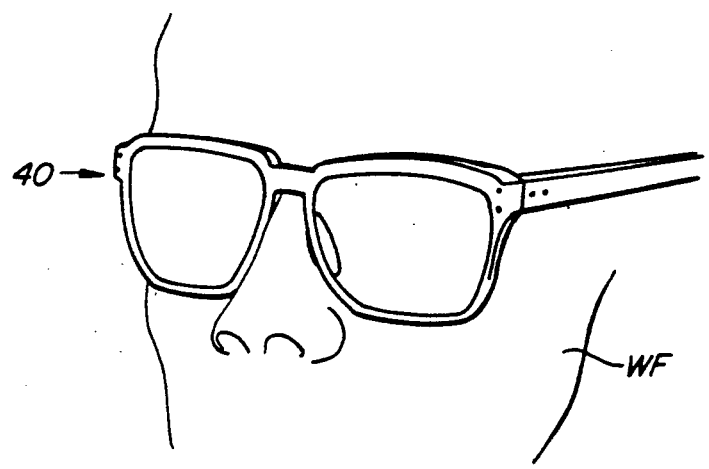
FIG. 6 illustrates the eyeglass frame of FIG. 5 in place on a wearer's face conforming to the contour of the wearer's nasal bridge.

After the moldable pads 10, 42, and 44 are secured as illustrated in FIG. 5, the eyeglass frame 40 will be placed on a wearer's face WF, as illustrated in FIG. 6. The fitting optician may then apply gentle pressure to the eyeglass frame in order to compress the various pad regions against the face and cranial regions which support the frame. Such pressure is maintained for a sufficient time in order to mold the moldable layer 12 while it is still in its uncured, malleable state. The glasses are then gently removed from the wearer's face and exposed to conditions which initiate curing the moldable layer 12. Conveniently, an ultraviolet chamber may be utilized in a conventional manner to cure the polymeric material. Other forms of radiation-induced curing would also be possible, including heat curing, E-beam curing, and curing using radiation from a radioactive source.

Although the foregoing invention has been described in detail for purposes of clarity of understanding, it will be obvious that certain modifications may be practiced within the scope of the appended claims.

What is claimed is:

1. A method for applying and conforming moldable pads to an eyewear frame, said method comprising:
   securing at least one pad to an inner surface of the nose bridge of the eyewear frame;
   conforming the pad to the contour of an individual wearer's nose; and
   curing the pad so that the contour is permanently imparted in the pad material.

2. A method as in claim 1, further comprising:
   securing at least one pad to an inner surface of each bow of the eyewear frame;
   conforming the pad to the contour of the individual wearer's head; and
   curing the pad so that the contour is permanently imparted to the pad material.

3. A method as in claim 1, wherein the pad is secured to the inner surface of the nose bridge by contacting an adhesive surface on the pad with said inner surface.

4. A method as in claim 1, wherein the pad is conformed to the contour of the wearer's nose by pressing the nose bridge down onto the nose.

5. A method as in claim 1, wherein the conformed pad is cured by exposure to radiation which induces cross-linking of a polymeric material within the pad.

6. A method as in claim 5, wherein the radiation is ultraviolet radiation.

7. A conformable pad for attaching to an inner surface of an eyewear frame, said conformable pad comprising:
   a moldable layer capable of conforming to the contour of an individual wearer's facial or cranial features and thereafter being cured to substantially permanently retain said contour, said moldable layer having a thickness in the range from about 0.5 to 4 mm;
   a backing layer laminated to the moldable layer; and
   an adhesive layer laminated to the backing layer on the side opposite to the moldable layer.

8. A conformable pad as in claim 7, wherein the moldable layer is composed of a polymeric material which can be cured by radiation-induced cross-linking.

9. A conformable pad as in claim 8, wherein the polymeric material is a silicone elastomer which can be cured by exposure to ultraviolet radiation.

10. A conformable pad as in claim 9, wherein the silicone elastomer has a Durometer shore A hardness below about 5 prior to curing and above 5 after curing.

11. A conformable pad as in claim 10, wherein the silicone elastomer has a tensile strength below about 1 lb/in$^2$ prior to curing and above about 50 after curing.

12. A conformable pad as in claim 11, wherein the silicone elastomer has a tensile shear strength below about 1 lb/in prior to curing and above about 10 after curing.

13. A conformable pad as in claim 11, wherein the silicone elastomer has a needle penetration value greater than about 5 mm/100 gm prior to curing.

14. A conformable pad transfer system comprising:
a moldable layer capable of conforming to the contour of an individual wearer's facial or cranial features and thereafter being cured to substantially permanently retain said contour, said moldable layer having a thickness in the range from about 0.5 to 4 mm;
a backing layer laminated to the moldable layer;
an adhesive layer laminated to the backing layer on the side opposite to the moldable layer; and
a peelable layer laminated to the adhesive layer.

15. A conformable pad transfer system as in claim 14, wherein the moldable layer is composed of a polymeric material which can be cured by radiation-induced crosslinking.

16. A conformable pad transfer system as in claim 15, wherein the polymeric material is a silicone elastomer which can be cured by exposure to ultraviolet radiation.

17. A conformable pad transfer system as in claim 16, wherein the silicone elastomer has a Durometer shore A hardness below about 5 prior to curing and above about 5 after curing.

18. A conformable pad transfer system as in claim 17, wherein the silicone elastomer has a tensile strength below about 1 lb/in$^2$ prior to curing and above about 50 after curing.

19. A conformable pad transfer system as in claim 18, wherein the silicone elastomer has a tensile shear strength below about 1 lb/in$^2$ prior to curing and above about 10 after curing.

20. A conformable pad transfer system as in claim 17, wherein the silicone elastomer has a needle penetration value greater than about 5 mm/100 gm prior to curing.

21. A conformable pad transfer system as in claim 14, in the form of a continuous sheet which may be cut into individual pads.

22. A conformable transfer system as in claim 14, wherein the moldable layer, backing layer, and adhesive layer are pre-cut, to fit on an inner surface of the nose bridge of an eyewear frame and the peelable layer is oversized to facilitate removal and handling.

23. A conformable pad transfer system as in claim 14, wherein the moldable layer, backing layer, and adhesive layer are pre-cut to fit on the bow piece of an eyewear frame and the peelable layer is oversized to facilitate removal and handling.

* * * * *